Dec. 4, 1934. C. J. DUNZWEILER 1,983,219
STORAGE BATTERY CONTAINER
Filed March 24, 1933
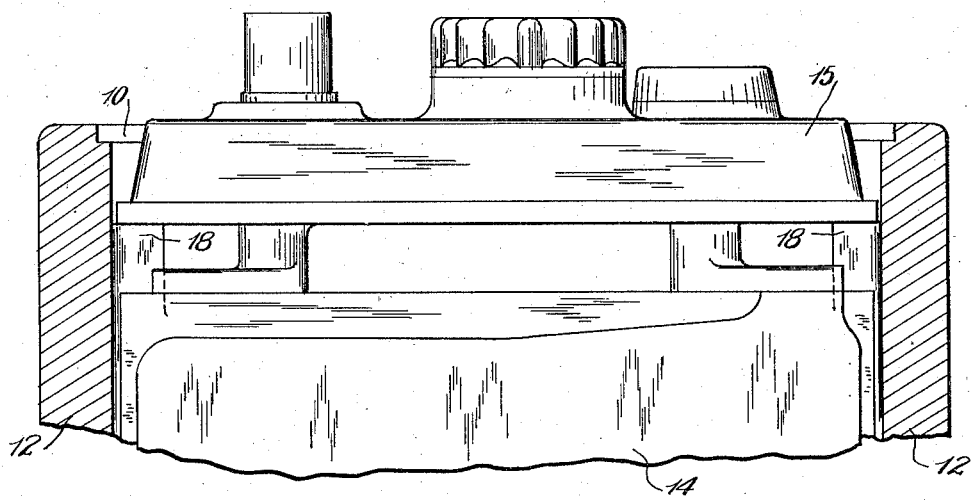
FIG. 1
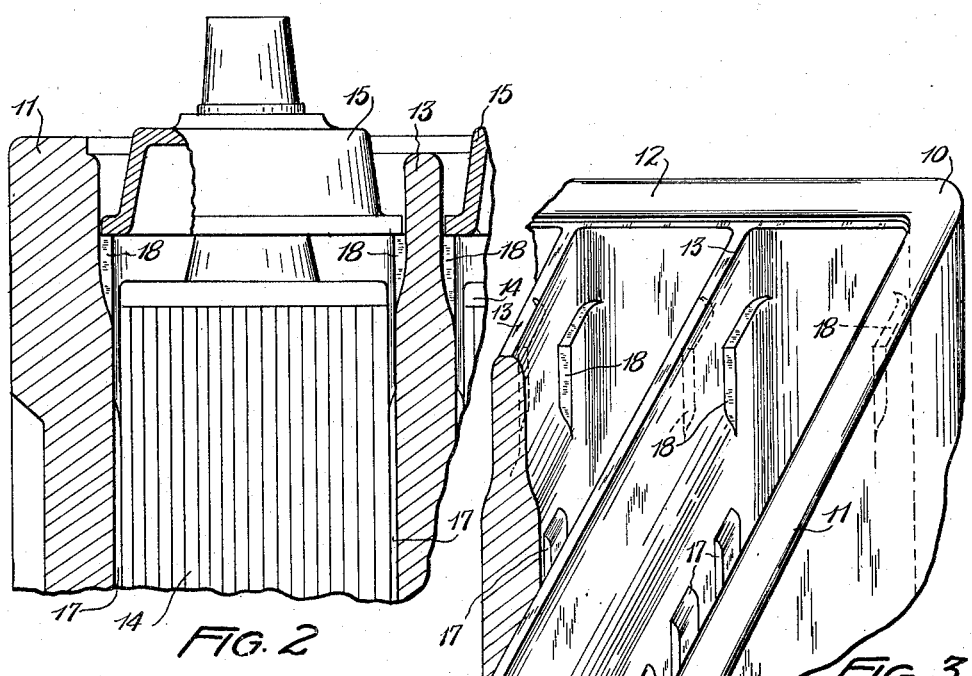
FIG. 2
FIG. 3
INVENTOR:
CARL J. DUNZWEILER
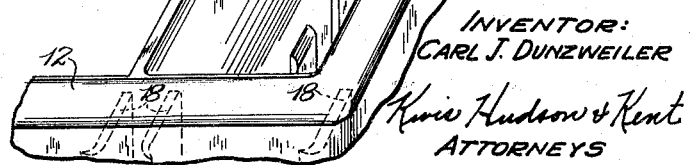
ATTORNEYS Patented Dec. 4, 1934

1,983,219

UNITED STATES PATENT OFFICE 1,983,219

STORAGE BATTERY CONTAINER

Carl J. Dunzweiler, Cleveland, Ohio, assignor to Willard Storage Battery Company, Cleveland, Ohio, a corporation of West Virginia Application March 24, 1933, Serial No. 662,546

4 Claims. (Cl. 136—166)

This invention relates to storage battery containers and particularly to multi-compartment monoblock containers which are commonly made from hard rubber and bituminous compositions. The present invention relates particularly to the provision of novel and effective means in the container to support the cell covers.

Storage battery manufacturers are frequently required to supply batteries having different numbers of plates and therefore different thicknesses of battery elements. In some instances, it is desirable that containers having the same outside dimensions be used for batteries having elements with different numbers of plates and therefore thickness, in which event the cell compartments are either varied in width or the partitions and the end walls of the container are provided with upright ribs so that the battery elements will fit closely in the compartments. Sometimes, in order to obtain the proper acid space, it is desirable to both vary the thickness of the partitions and end walls and provide the ribs.

I have been able to effect an economy by the use of what I may term universal covers, i. e., covers of standard or fixed dimensions for use on containers whose width of cell compartment varies to adapt the compartments for elements of different widths. This economy is made possible by giving the partitions and the end walls of the container, from a point a short distance below the top, the desired thickness to suit the width of the battery element and to taper the upper portions of the sides of the partitions and the upper portions of the inner surfaces of the end walls so that near the top of the container, or down to the level to which the covers are fitted, they are of uniform width, thus making it possible for the same covers to be fitted into compartments which vary in width where the battery element is to be received.

This expedient has made it possible for me to provide cover supporting ledges in a very effective manner without thinning or weakening any of the walls and without interfering with the insertion of the battery elements in the containers.

This invention may be briefly summarized as consisting in certain novel details of construction and combinations and arrangements of parts which will be described in the specification and set forth in the appended claims.

In the accompanying sheet of drawing,

Figure 1 is a longitudinal sectional view taken through the upper part of one of the battery cells;

Fig. 2 is a transverse sectional view showing one cell and a portion of an adjoining cell; and Fig. 3 is a perspective view showing a portion of the battery container.

Referring now to the drawing, 10 represents a container having end walls 11, side walls 12, and partitions 13 which are formed integral with the side walls and bottom, forming different cell compartments, as is customary in multicell storage battery containers. Each compartment is adapted to receive a battery element 14 and to be closed by a cell cover 15. It is to be noted that near the top of the container the partitions are tapered or thinned and that the end walls also near the top are made somewhat thinner. This provides below the tapered or thinned portions relatively thick partitions and end walls for one of the thinner battery elements, while, at the same time, it leaves a space near the top of each compartment for the cell cover 15 capable of being used for battery elements of different thicknesses, as pointed out above. In addition to the thickened walls of the partitions and ends of the container, the sides of the partitions and the inner sides of the container end walls are, in this instance, provided at the thickened portions with ribs 17, but these I do not regard as essential as they may be omitted, it being understood that the ribs along the sides of any one compartment are adapted to be engaged by the opposite sides of the battery element which is inserted in the battery compartment.

Coming now to the cover supports, it will be noted that the thinning of the partitions and the end walls is extended down some distance below the cell cover 15 when it is fitted into the compartment, in fact the thinning is extended down about as far as or further below the cover than the distance from the bottom of the cover to the top of the container, and it is on the thinned or tapered portions which lie below the cover when in normal position that I provide cover ledges 18 which are provided on the partitions and ends of the container. These ledges are formed by extending upwardly at any desired points or positions along the partitions or end walls, but preferably adjacent the four corners of each compartment, relatively thickened portions of the partitions and end walls of the container to the level to be occupied by the bottom or lower side of the cover, and at the upper ends of these extensions shoulders are provided forming supporting ledges in each compartment for the compartment cover. It will be noted, therefore, that since the vertical walls of the ledges are virtually continuations of the relatively thick vertical sides of the partitions and end walls of the container, and since the battery element is of a thickness somewhat less than the distance between the vertical thickened sides of the compartment walls, the ledges do not form projections which will interfere with the insertion of the battery element in the compartment, and, furthermore, the ledges are formed not by thinning or weakening any of the compartment walls, but by building onto them in a manner such that they do not offer difficulties either in construction or in assembling the parts of the battery.

As shown, the length of the cover supporting shoulders, horizontally considered, is fairly short compared with the length of the cell compartments, but these shoulders may be widened if desired even to the extent of having them entirely or substantially along the entire side of the partitions and end walls, or relatively short cover supporting shoulders may be provided on the partitions and end walls at other points than adjacent the corners as illustrated, as pointed out above. I therefore do not desire to be confined to the exact arrangement illustrated, but aim in my claims to cover all modifications which do not involve a departure from the spirit and scope of the invention.

Having thus described my invention, I claim:

1. A storage battery container comprising a body portion and a cover, the body portion having a cell with opposite sides thereof thinned at the top to receive the cover and having substantially horizontal shoulders formed on the thinned portions at a definite height between the top and bottom of the thinned portions, the cover resting on said shoulders.

2. A storage battery container comprising a body portion having a cell compartment with side walls having a relatively narrow element-receiving space below the top of the compartment and having its longitudinal or side walls reduced in thickness at the top of the container to accommodate a cover for compartments with element spaces of varying widths, and cover ledges extending upwardly from the relatively thick portions of the side walls for a distance along the relatively thin portions forming substantially horizontal shoulders between the top and bottom of the relatively thin portions, and a cover having a marginal bottom portion resting on said shoulders.

3. A storage battery container of the multi-compartment type comprising a body portion having side and end walls and transverse partitions, the end walls and partitions being reduced in thickness near the top of each compartment to accommodate a cover wider than is required for the element space, the relatively thick portions being extended upwardly for a distance and terminating in substantially horizontal shoulders between the top and bottom of the reduced portions, and individual covers for the different compartments each resting upon the said shoulders formed in a compartment.

4. A storage battery container of the multi-compartment type comprising a body portion having side and end walls and transverse partitions, the end walls and partitions being reduced in thickness near the top of each compartment to accommodate a cover wider than is required for the element space, the relatively thick portions adjacent the four corners of each compartment being extended upwardly for a distance and terminating in substantially horizontal shoulders between the top and bottom of the reduced portions, and individual covers for the different compartments each resting upon the said shoulders formed in a compartment.

CARL J. DUNZWEILER.